US012511317B2

(12) United States Patent
Bregman et al.

(10) Patent No.: US 12,511,317 B2
(45) Date of Patent: *Dec. 30, 2025

(54) SYSTEMS FOR SECURELY SEARCHING TEXTUAL CONTENT ACROSS MULTIPLE DOCUMENTS IN VARIOUS REPOSITORIES

(71) Applicant: Rocket Software Technologies, Inc., Waltham, MA (US)

(72) Inventors: Yan Bregman, East Brunswick, NJ (US); Maxim Sorkin, Valley Glen, CA (US); Bobby Kumar, Monroe, NY (US); Chris Malunowicz, Frisco, TX (US)

(73) Assignee: Rocket Software Technologies, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/911,640

(22) Filed: Oct. 10, 2024

(65) Prior Publication Data

US 2025/0036668 A1    Jan. 30, 2025

Related U.S. Application Data

(63) Continuation of application No. 18/463,886, filed on Sep. 8, 2023, now Pat. No. 12,118,023.

(60) Provisional application No. 63/406,927, filed on Sep. 15, 2022.

(51) Int. Cl.
| | | |
|---|---|---|
| G06F 16/00 | (2019.01) | |
| G06F 16/332 | (2019.01) | |
| G06F 16/338 | (2019.01) | |
| G06F 16/38 | (2019.01) | |
| G06F 21/62 | (2013.01) | |

(52) U.S. Cl.
CPC ........ *G06F 16/3326* (2019.01); *G06F 16/338* (2019.01); *G06F 16/38* (2019.01); *G06F 21/6245* (2013.01)

(58) Field of Classification Search
CPC ..... G06F 16/3326; G06F 16/338; G06F 16/38
See application file for complete search history.

(56) References Cited

U.S. PATENT DOCUMENTS

| | | | | |
|---|---|---|---|---|
| 7,181,438 B1 * | 2/2007 | Szabo | ................ | G06Q 30/0269 705/14.27 |
| 7,711,729 B2 * | 5/2010 | Zhao | ....................... | G06F 16/38 707/715 |
| 8,065,315 B2 * | 11/2011 | Rapp | ................... | G06F 11/0709 707/706 |

(Continued)

*Primary Examiner* — Noosha Arjomandi
(74) *Attorney, Agent, or Firm* — Danielson Legal LLC

(57) ABSTRACT

According to various embodiments a device may provide an interactive searching interface for securely searching of textual content across a plurality of documents stored in a plurality of repositories comprising heterogenous data, the securely searching of the textual content comprising using a flexible search criteria and enforcing user access privileges to the plurality of documents A device may use unified searching, using a unified search criteria definition, the plurality of repositories in response to the feedback from the user, the unified searching being interactive, iterative, and using a unified index resulting in faster query response times than the metadata searching the plurality of repositories.

20 Claims, 8 Drawing Sheets

(56) References Cited

U.S. PATENT DOCUMENTS

| | | | |
|---|---|---|---|
| 8,843,750 B1* | 9/2014 | Sokolov | H04L 63/0823 713/175 |
| 10,534,783 B1* | 1/2020 | Raczko | G06F 3/04817 |
| 10,936,585 B1* | 3/2021 | Echeverria | G06F 16/258 |
| 11,615,084 B1* | 3/2023 | Echeverria | G06N 5/04 707/721 |
| 12,013,852 B1* | 6/2024 | Echeverria | G06F 16/258 |
| 2007/0208714 A1* | 9/2007 | Ture | G06F 21/6227 |
| 2007/0208744 A1* | 9/2007 | Krishnaprasad | H04L 63/0815 707/999.009 |
| 2007/0208745 A1* | 9/2007 | Ture | G06F 21/6227 707/999.009 |
| 2007/0208746 A1* | 9/2007 | Koide | G06F 21/6218 707/999.009 |
| 2007/0214129 A1* | 9/2007 | Ture | G06F 16/951 |
| 2007/0220268 A1* | 9/2007 | Krishnaprasad | G06F 16/2455 713/182 |
| 2008/0270250 A1* | 10/2008 | Bolivar | G06Q 40/04 705/26.1 |
| 2009/0089250 A1* | 4/2009 | Stieber | G06F 16/335 |
| 2011/0010742 A1* | 1/2011 | White | H04N 21/47 725/53 |
| 2012/0047247 A1* | 2/2012 | Piernot | G06F 16/901 709/224 |
| 2012/0265767 A1* | 10/2012 | Brdiczka | G06F 16/3344 707/769 |
| 2013/0144889 A1* | 6/2013 | Gupta | G06F 16/334 707/769 |
| 2015/0365385 A1* | 12/2015 | Hore | H04L 63/0428 713/152 |
| 2017/0039421 A1* | 2/2017 | Eschbach | G06V 30/418 |
| 2017/0039422 A1* | 2/2017 | Eschbach | G06F 21/64 |
| 2017/0041296 A1* | 2/2017 | Ford | G06F 21/64 |
| 2020/0151185 A1* | 5/2020 | Raczko | G06F 16/9535 |
| 2021/0089601 A1* | 3/2021 | Osann, Jr. | G06F 16/9535 |
| 2021/0174155 A1* | 6/2021 | Smith | G06F 18/211 |
| 2021/0182344 A1* | 6/2021 | Shyamkumar | G06F 16/93 |
| 2021/0406723 A1* | 12/2021 | Hintz | G06F 16/334 |
| 2023/0205794 A1* | 6/2023 | Smaagard | G06F 16/322 707/765 |
| 2024/0135028 A1* | 4/2024 | Cassidy | G06F 16/9538 |

\* cited by examiner

Providing an interactive searching interface for securely searching of textual content across a plurality of documents stored in a plurality of repositories comprising heterogenous data, the securely searching of the textual content comprising using a flexible search criteria and enforcing user access privileges to the plurality of documents — 210

Receiving a search request using the interactive searching interface from a user, the search request comprising the flexible search criteria — 220

Metadata searching the plurality of repositories using the flexible search criteria, the metadata searching the plurality of repositories using the flexible search criteria for providing result documents — 230

Context searching the result documents, the context searching providing results pages of the result documents — 240

Integrating the metadata searching the plurality of repositories with the context searching the result documents into a unified search criteria definition — 250

Providing the results pages of the result documents to the user using the interactive searching interface, the providing the results pages of the result documents enforcing the user access privileges to the plurality of documents — 260

Receiving feedback from the user in response to the providing the results pages of the result documents to the user using the interactive searching interface — 270

Unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories — 280

FIG. 2

SYSTEMS FOR SECURELY SEARCHING TEXTUAL CONTENT ACROSS MULTIPLE DOCUMENTS IN VARIOUS REPOSITORIES

CROSS REFERENCE TO RELATED APPLICATION

This application is a continuation of U.S. patent application Ser. No. 18/463,886, filed on Sep. 8. 2023, and since issued as U.S. Pat. No. 12,118,023 on Oct. 15, 2024, which claims the priority benefit of U.S. Prov. Pat. Appl. No. 63/406,927 filed on Sep. 15, 2022. The aforementioned disclosure is hereby incorporated by reference herein in its entirety including all references cited therein.

FIELD OF THE TECHNOLOGY

The present disclosure relates to methods, systems, and apparatus for securely searching textual content across multiple documents in various repositories while using flexible search criteria.

BACKGROUND

Previous approaches for searching textual content across multiple documents stored in different repositories have typically involved using separate search interfaces for each repository or using a centralized search interface that only allows for basic keyword searches. These approaches often lack flexibility in search criteria and do not provide a comprehensive solution for securely searching heterogenous data.

In some cases, metadata searching has been employed to search the repositories based on predefined metadata attributes such as document title, author, or date. While this approach can provide some level of search functionality, it is limited in its ability to capture the full context and content of the documents. Additionally, enforcing user access privileges to the documents during the search process has been a challenge in these previous approaches.

Another approach involves context searching, which involves analyzing the content of the documents to identify relevant information based on the search criteria. However, this approach has typically been used in isolation and does not integrate with the metadata searching process. As a result, the search results may not be comprehensive or accurate.

Furthermore, previous approaches have not provided a unified search criteria definition that combines both metadata searching and context searching. This lack of integration hinders the ability to effectively search across multiple repositories and obtain accurate and relevant search results. Additionally, the query response times in these previous approaches have been slow due to the lack of a unified index.

In summary, previous approaches to searching textual content across multiple repositories have been limited in their flexibility, lack of integration between metadata and context searching, and slow query response times. However, none of these approaches have provided a comprehensive solution that combines the features described using the present technology.

SUMMARY

According to some embodiments, the present technology is directed to a method comprising providing an interactive searching interface for securely searching of textual content across a plurality of documents stored in a plurality of repositories including heterogenous data, the securely searching of the textual content including using a flexible search criteria and enforcing user access privileges to the plurality of documents; receiving a search request using the interactive searching interface from a user, the search request including the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

In some embodiments, the techniques described herein relate to a method, wherein the providing the results pages of the result documents to the user using the interactive searching interface includes displaying the results pages of the result documents in the interactive searching interface, the results pages being highlighted.

In some embodiments, the techniques described herein relate to a method, wherein the providing the results pages of the result documents to the user includes exporting the results pages of the result documents in a table format.

In some embodiments, the techniques described herein relate to a method, the enforcing user access privileges to the plurality of documents includes redacting personal information from the results pages of the result documents based on access privileges of the user.

In some embodiments, the techniques described herein relate to a method, wherein the access privileges of the user including hierarchical user access privileges.

In some embodiments, the techniques described herein relate to a method, the enforcing user access privileges to the plurality of documents includes un-redacting personal information from the results pages of the result documents based on access privileges of the user.

In some embodiments, the techniques described herein relate to a method, wherein the aggregation layer includes an aggregation switch allowing multiple network connections to be bundled together into a single link enabling increased bandwidth and increased network performance.

In some embodiments, the techniques described herein relate to a method, wherein the plurality of documents include a plurality of document formats, the plurality of document formats including, advanced function presentation (AFP), portable document format (PDF), printer command language (PCL), and text (TXT).

In some embodiments, the techniques described herein relate to a method, wherein the flexible search criteria includes a varying search scope, the varying search including a single page search result or multiple document folders.

In some embodiments, the techniques described herein relate to a method, wherein the securely searching of the textual content includes text filtering, the text filtering including page location of matching text; and wherein the providing the results pages of the result documents to the user using the interactive searching interface includes highlighting the page location of matching text in the result documents.

In some embodiments, the techniques described herein relate to a method, further including: saving the unified search criteria definition to a single unified index; and using the single unified index for the unified searching.

In some embodiments, the techniques described herein relate to a method, wherein the single unified index includes content from the plurality of repositories.

In some embodiments, the techniques described herein relate to a method, wherein the unified searching includes a two-level text search in a single search, the two-level text search including a first search result including filtered pages that match a specified text pattern and a second search result, the second search result being text search results of the filtered pages.

In some embodiments, the techniques described herein relate to a method, further including integrating the first search result and the second search result into a single search result.

In some embodiments, the techniques described herein relate to a method, wherein the heterogenous data includes different data types and different data formats.

In some embodiments, the techniques described herein relate to a method, wherein the providing the results pages of the result documents enables the user to cancel a search in real-time.

In some embodiments, the techniques described herein relate to a method, wherein the providing the results pages of the result documents to the user using the interactive searching interface includes results being presented asynchronous in real-time.

In some embodiments, the techniques described herein relate to a system, including: one or more hardware processors configured by machine-readable instructions to perform the following operations: providing an interactive searching interface for securely searching of textual content across a plurality of documents stored in a plurality of repositories including heterogenous data, the securely searching of the textual content including using a flexible search criteria and enforcing user access privileges to the plurality of documents; receiving a search request using the interactive searching interface from a user, the search request including the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

In some embodiments, the techniques described herein relate to an apparatus, including: at least one memory storing computer program instructions; and at least one processor configured to execute the computer program instructions to cause the apparatus at least to perform the following operations: providing an interactive searching interface for securely searching of textual content across a plurality of documents stored in a plurality of repositories including heterogenous data, the securely searching of the textual content including using a flexible search criteria and enforcing user access privileges to the plurality of documents; receiving a search request using the interactive searching interface from a user, the search request including the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

In some embodiments, the techniques described herein relate to an apparatus, wherein the unified searching includes a two-level text search in a single search, the two-level text search including a first search result including filtered pages that match a specified text pattern and a second search result, the second search result being text search results of the filtered pages.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 2 illustrates a method for securely searching textual content across multiple documents in various repositories while using flexible search criteria, according to various embodiments of the present technology.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

Figure 1:
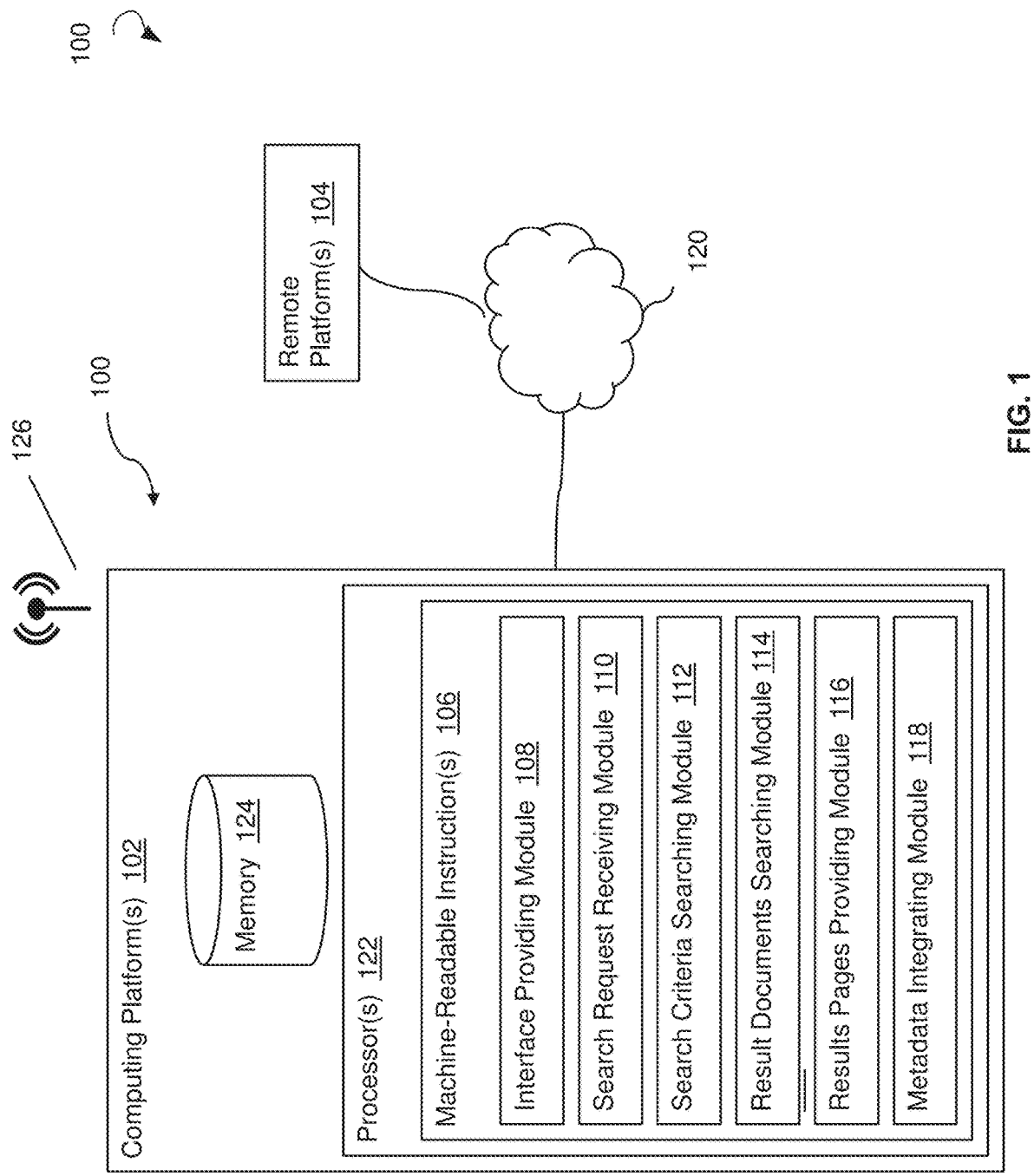
FIG. 1 illustrates a system configured for securely searching textual content across multiple documents in various repositories while using flexible search criteria, according to various embodiments of the present technology.

According to some embodiments, FIG. 1 illustrates a system configured for securely search textual content across multiple documents in various repositories while using flexible search criteria, in accordance with one or more embodiments. In some cases, system 100 may include one or more computing platforms 102. The one or more computing platforms 102 may be communicably coupled with one or more remote platforms 104. In some cases, users may access the system 100 via one or more remote platform(s) 104.

According to some embodiments, the one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of interface providing module 108, search request receiving module 110, search criteria searching module 112, result documents searching module 114, results pages providing module 116, metadata integrating module 118, and/or other modules. For example, other modules include providing an interactive searching interface module, a receiving a search request module, a metadata searching the plurality of repositories module, a context searching the result documents module, an integrating the metadata searching the plurality of repositories module, a providing the results pages of the result documents to the user module, a receiving feedback from the user in response to the providing the results pages of the result documents to the user module, and a unified searching module.

According to some embodiments, interface providing module 108 may be configured to provide an interactive searching interface for securely searching of textual content across multiple documents in various repositories while using flexible search criteria. Search request receiving module 110 may be configured to receive a search request using the interactive searching interface from a user, the search request comprising a search criteria. Search criteria searching module 112 may be configured to metadata search a plurality of repositories using the search criteria, the metadata searching the plurality of repositories using the search criteria providing result documents. Result documents searching module 114 may be configured to context search the result documents, the context searching providing results pages of the result documents. Results pages providing module 116 may be configured to provide the results pages of the result documents to the user using the search interface.

According to various embodiments, metadata integrating module 118 may be configured to integrate the metadata searching the plurality of repositories with the context searching of the result documents into a unified search criteria definition.

In some embodiments, the one or more computing platforms 102, may be communicatively coupled to the remote platform(s) 104. In some cases, the communicative coupling may include communicative coupling through a networked environment 120. The networked environment 120 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 120 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 120 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, etc. According to certain embodiments, remote platforms 104 may be standalone servers, networked servers, or an array of servers.

According to some embodiments, the one or more computing platforms 102 may include one or more processors 122 for processing information and executing instructions or operations. One or more processors 122 may be any type of general or specific purpose processor. In some cases, one or more processors 122 may be utilized according to other embodiments. In fact, the one or more processors 122 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 122 may be remote from the one or more computing platforms 102, such as disposed within a remote platform like the one or more remote platforms 104 of FIG. 1.

According to some embodiments, the one or more processors 122 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

According to various embodiments, the one or more computing platforms 102 may further include or be coupled to a memory 124 (internal or external), which may be coupled to one or more processors 122, for storing information and instructions that may be executed by one or more processors 122. Memory 124 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 124 can consist of any combination of random-access memory (RAM), read only memory (ROM), static storage such as a magnetic or optical disk, hard disk drive (HDD), or any other type of non-transitory machine or computer readable media. The instructions stored in memory 124 may include program instructions or computer program code that, when executed by one or more processors 122, enable the one or more computing platforms 102 to perform tasks as described herein.

In some embodiments, one or more computing platforms 102 may also include or be coupled to one or more antennas 126 for transmitting and receiving signals and/or data to and from one or more computing platforms 102. The one or more antennas 126 may be configured to communicate via, for example, a plurality of radio interfaces that may be coupled to the one or more antennas 126. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

FIG. 2 illustrates an example method 200 for securely searching textual content across multiple documents in various repositories while using flexible search criteria, according to various embodiments of the present technology.

At step 210, providing an interactive searching interface for securely searching of textual content across a plurality of documents stored in a plurality of repositories comprising heterogenous data, the securely searching of the textual content comprising using a flexible search criteria and enforcing user access privileges to the plurality of documents.

At step 220, receiving a search request using the interactive searching interface from a user, the search request comprising the flexible search criteria.

At step 230, metadata searching the plurality of repositories using the flexible search criteria, the metadata searching the plurality of repositories using the flexible search criteria for providing result documents.

At step 240, context searching the result documents, the context searching providing results pages of the result documents.

At step 250, integrating the metadata searching the plurality of repositories with the context searching the result documents into a unified search criteria definition.

At step 260, providing the results pages of the result documents to the user using the interactive searching interface, the providing the results pages of the result documents enforcing the user access privileges to the plurality of documents.

At step 270, receiving feedback from the user in response to the providing the results pages of the result documents to the user using the interactive searching interface.

At step 280, unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

In some embodiments, the method 200 may be performed by one or more hardware processors, such as the processors 122 of FIG. 1, configured by machine-readable instructions, such as the machine-readable instructions 106 of FIG. 1. In this aspect, the method 200 may be configured to be implemented by the modules, such as interface providing module 108, search request receiving module 110, search criteria searching module 112, result documents searching module 114, results pages providing module 116, metadata integrating module 118, providing an interactive searching interface module, a receiving a search request module, a metadata searching the plurality of repositories module, a context searching the result documents module, an integrating the metadata searching the plurality of repositories module, a providing the results pages of the result documents to the user module, a receiving feedback from the user in response to the providing the results pages of the result documents to the user module, and a unified searching module as discussed above in FIG. 1.

Figure 3:
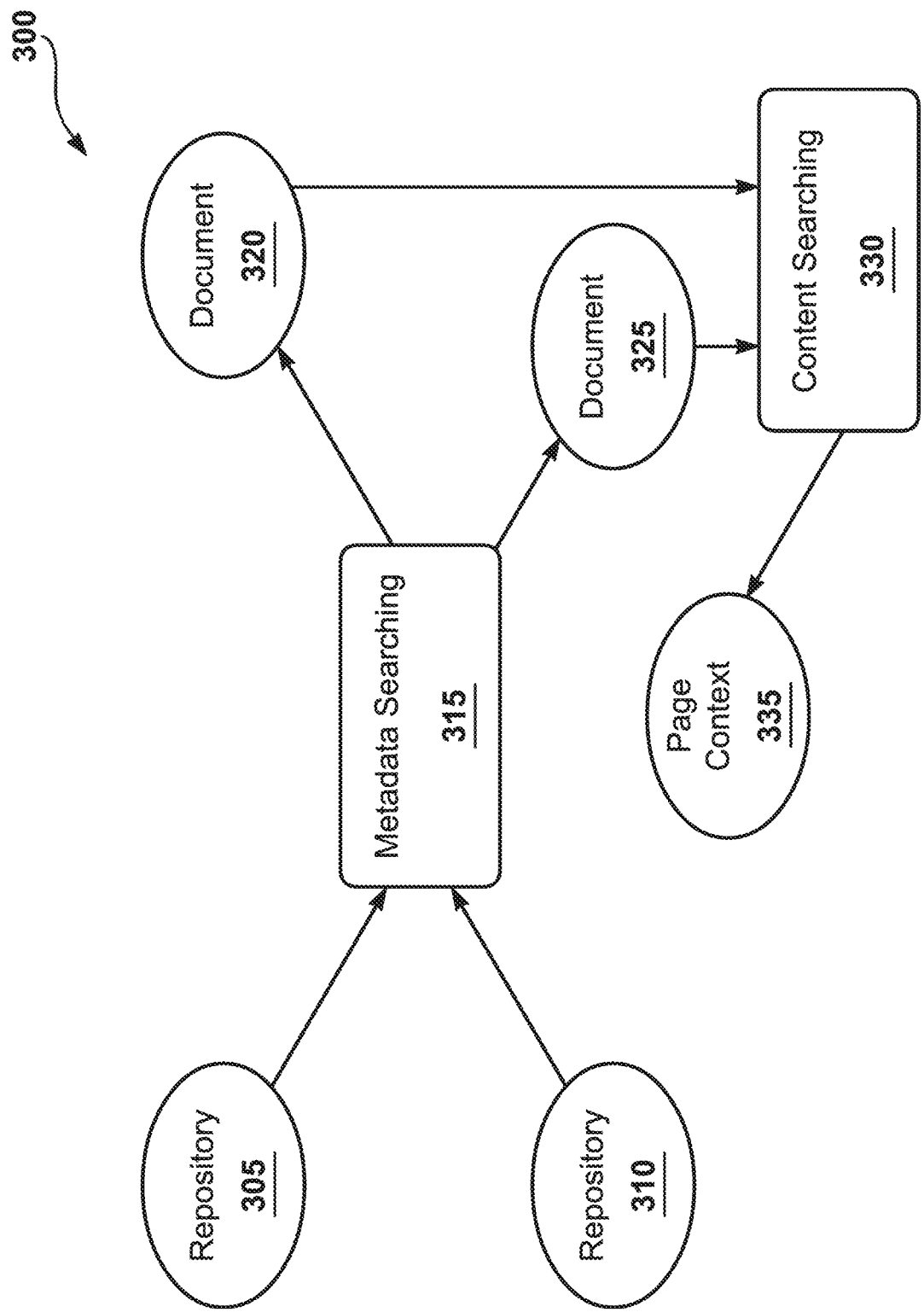
FIG. 3 shows a high-level block diagram of an exemplary system configured to securely search textual content across multiple documents in various repositories while using flexible search criteria, according to various embodiments of the present technology.

FIG. 3 shows a high-level block diagram 300 of an exemplary system configured to securely search textual content across multiple documents in various repositories while using flexible search criteria, according to various embodiments. For example, the system as shown in FIG. 3 is used for methods for securely searching textual content across multiple documents in various repositories (e.g., repository 305 and repository 310) while using flexible search criteria. The method may include providing an interactive searching interface for securely searching of textual content across multiple documents in various repositories (e.g., repository 305 and repository 310) while using flexible search criteria. The method may include receiving a search request using the interactive searching interface from a user, the search request comprising a search criteria. The method may include metadata searching (e.g., metadata searching 315) a plurality of repositories (e.g., repository 305 and repository 310) using the search criteria, the metadata searching (e.g., metadata searching 315) the plurality of repositories (e.g., repository 305 and repository 310) using the search criteria providing result documents (e.g., document 320 and document 325). The method may include context searching (e.g., content searching 330) the result documents (e.g., document 320 and document 325), the context searching providing results pages (e.g., page context 335) of the result documents (e.g., document 320 and document 325). The method may include providing the results pages (page context 335) of the result documents (e.g., document 320 and document 325) to the user using the search interface.

Various embodiments of the present technology support data governance by incorporating user access rights for restricted data such as personal information.

Various embodiments of the present technology support federation of document repositories by allowing searches in multiple heterogenous repositories (e.g., repository 305 and repository 310).

Various embodiments of the present technology support integrated searching of document metadata (e.g., indexes, etc.) and textual content.

Various embodiments of the present technology support multiple document formats such as Text, PDF, AFP, and the like.

Various embodiments of the present technology provide a search interface for varying search scopes, ranging from a single page to multiple document folders in multiple repositories (e.g., repository 305 and repository 310).

Various embodiments of the present technology allows a user to view found pages with results highlighted and to export of the full search results to a spreadsheet document.

Various embodiments of the present technology return an initial set of results quickly and allow a user to interactively proceed further with the search as requested by a user.

For example, in various embodiments candidate documents may be selected by a user, found by document metadata search (e.g., metadata searching 315), or provided by Representational State Transfer (REST) Application Program Interface (API). In other words when a client requests a resource using the REST API, the server transfers back the current state of the resource in a standardized representation.

For example, in various embodiments text search may be integrated with the metadata search (e.g., metadata searching 315) into a unified search criteria definition, which can be assigned a name and saved.

For example, in various embodiments text filtering of the present technology finds pages that contain text matching specified criteria and determines locations of matching text within the page.

For example, in various embodiments search criteria supports several operators such as "Contains", "BeginsWith"/"EndWith", and the like. Furthermore, in some embodiments Regular Expressions (RegEx) searches are also supported. For instance, RegEx searches use a regular expression that is a form of advanced searching that looks for specific patterns, as opposed to certain terms and phrases. With RegEx searches a user may use pattern matching to search for particular strings of characters rather than constructing multiple, literal search queries.

For example, in various embodiments unprivileged users are prevented from finding text secured by redaction policies such as a Social Security Number (SSN) redaction policy.

For example, in various embodiments searching runs in a separate task, with periodic progress updates available to the calling task.

In some embodiments the present technology enables Optical Character Recognition (OCR) searching of image documents.

In some embodiments the present technology enables showing several surrounding lines for each text search hit (e.g., results from content searching), or full pages for better visualization of results by a user. For example, user choice/preferences may drive these preferences.

In some embodiments the present technology enables a two-level text search in a single search. For example, first, pages are filtered to match a specified text pattern. Second, these candidate pages are text-searched as usual. For instance, non-matching pages may be ignored. For example, this two-level text search in a single search contrasts with industry-standard ability to interactively refine already-run searches by running additional searches.

Figure 4:
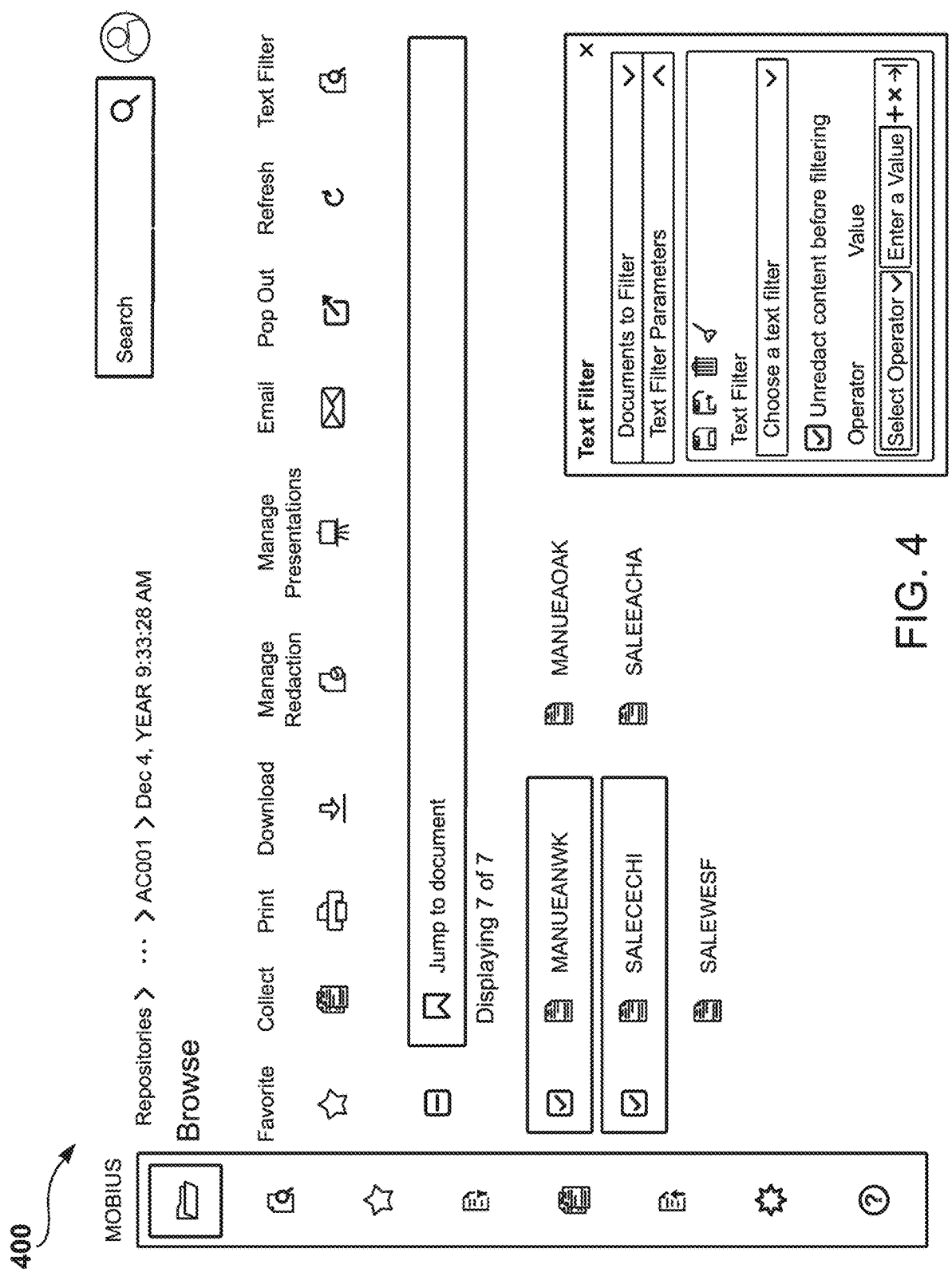
FIG. 4 illustrates interactive searching interface including text filter parameters, according to various embodiments of the present technology.

FIG. 4 illustrates interactive searching interface 400 including text filter parameters, according to various embodiments of the present technology. For example, the interactive searching interface 400 may be used for unified searching, using the unified search criteria definition, the plurality of repositories (e.g., repository 305 and repository 310) in response to the feedback from the user, the unified searching being interactive, iterative, and using a unified index resulting in faster query response times than the metadata searching the plurality of repositories (e.g., repository 305 and repository 310), the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories (e.g., repository 305 and repository 310).

Figure 5:
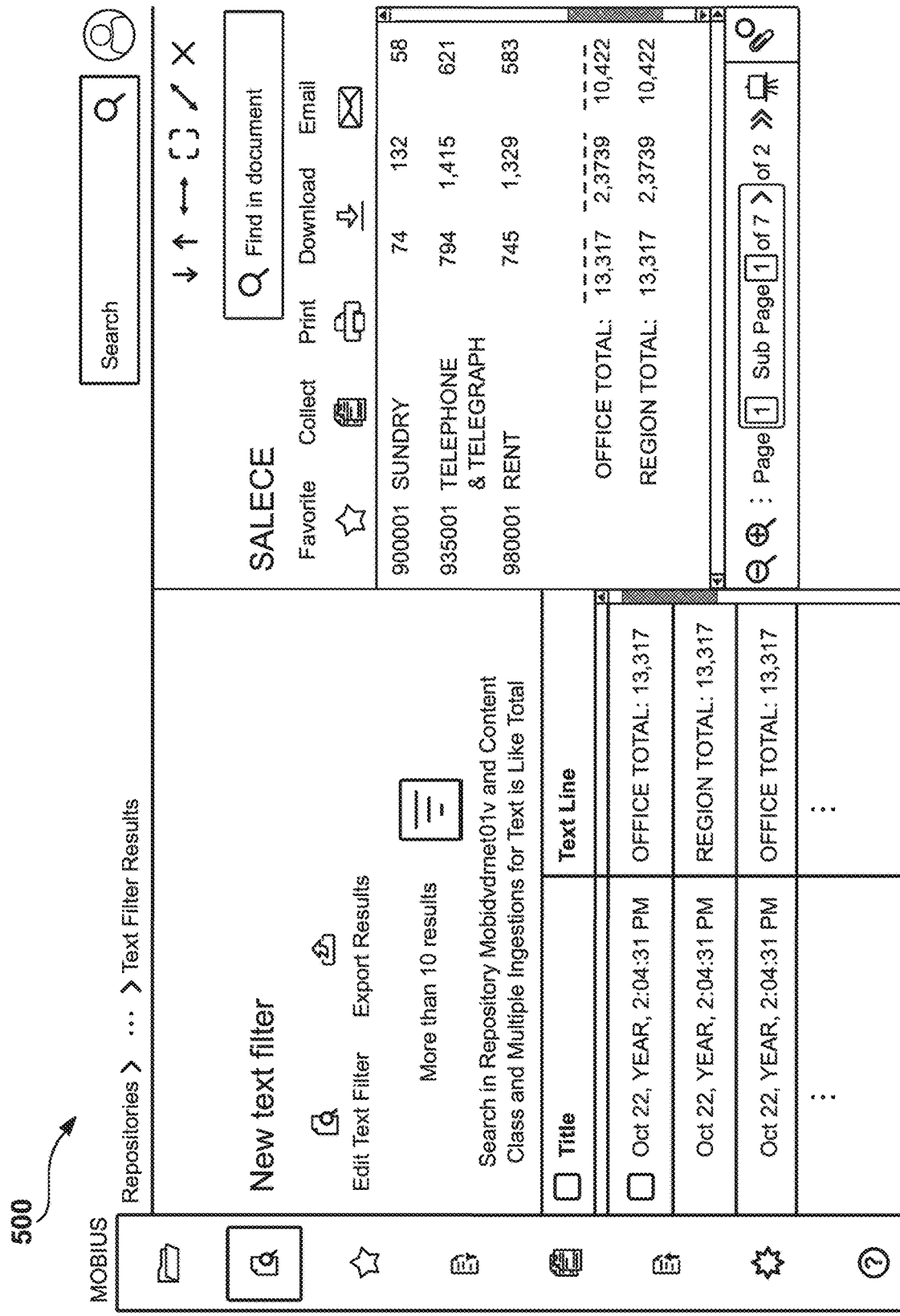
FIG. 5 illustrates another interactive search interface including search results, according to various embodiments of the present technology.

FIG. 5 illustrates another interactive searching interface 500 including search results, according to various embodiments of the present technology. For example, the interactive searching interface 500 may be used for the securely searching of the textual content comprises text filtering, the text filtering comprising page location of matching text; and the providing the results pages of the result documents to the user using the interactive searching interface comprises highlighting the page location of matching text in the result documents. In some instances, the providing the results pages of the result documents to the user using the interactive searching interface comprises results being presented asynchronous in real-time.

Figure 6:
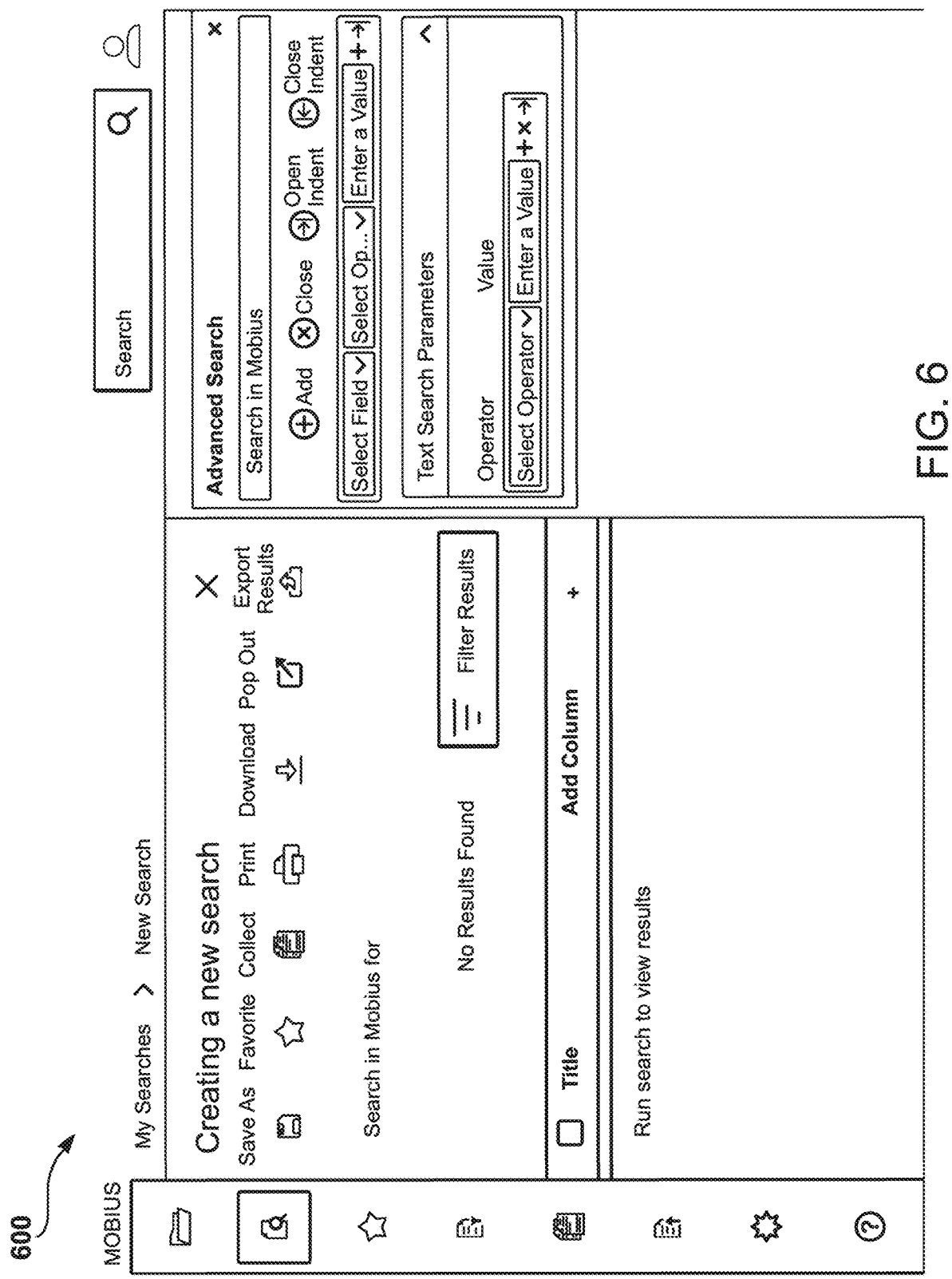
FIG. 6 illustrates another interactive searching interface including advanced search, according to various embodiments of the present technology.

FIG. 6 illustrates another interactive searching interface 600 including advanced search, according to various embodiments of the present technology. For example, the interactive searching interface 600 may be used for the unified searching comprises a two-level text search in a single search, the two-level text search comprising a first search result comprising filtered pages that match a specified text pattern and a second search result, the second search result being text search results of the filtered pages.

Figure 7:
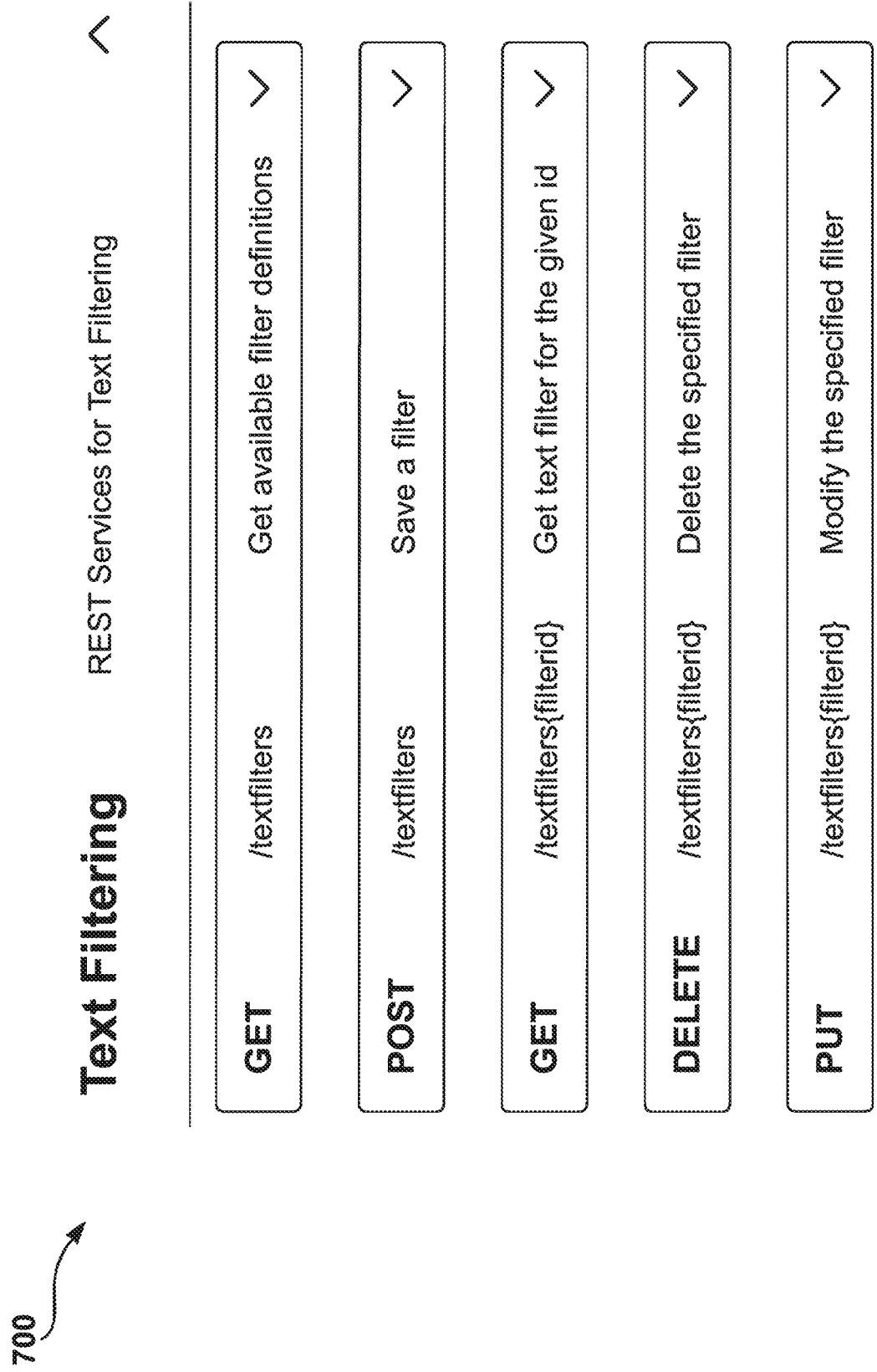
FIG. 7 illustrates a block diagram of text filtering application programming interface, according to various embodiments of the present technology.

FIG. 7 illustrates a block diagram of text filtering application programming interface 700, according to various embodiments of the present technology. For example, the text filtering application programming interface 700, may be used for the securely searching of the textual content comprises text filtering, the text filtering comprising page location of matching text; and wherein the providing the results pages of the result documents to the user using the interactive searching interface comprises highlighting the page location of matching text in the result documents.

Figure 8:
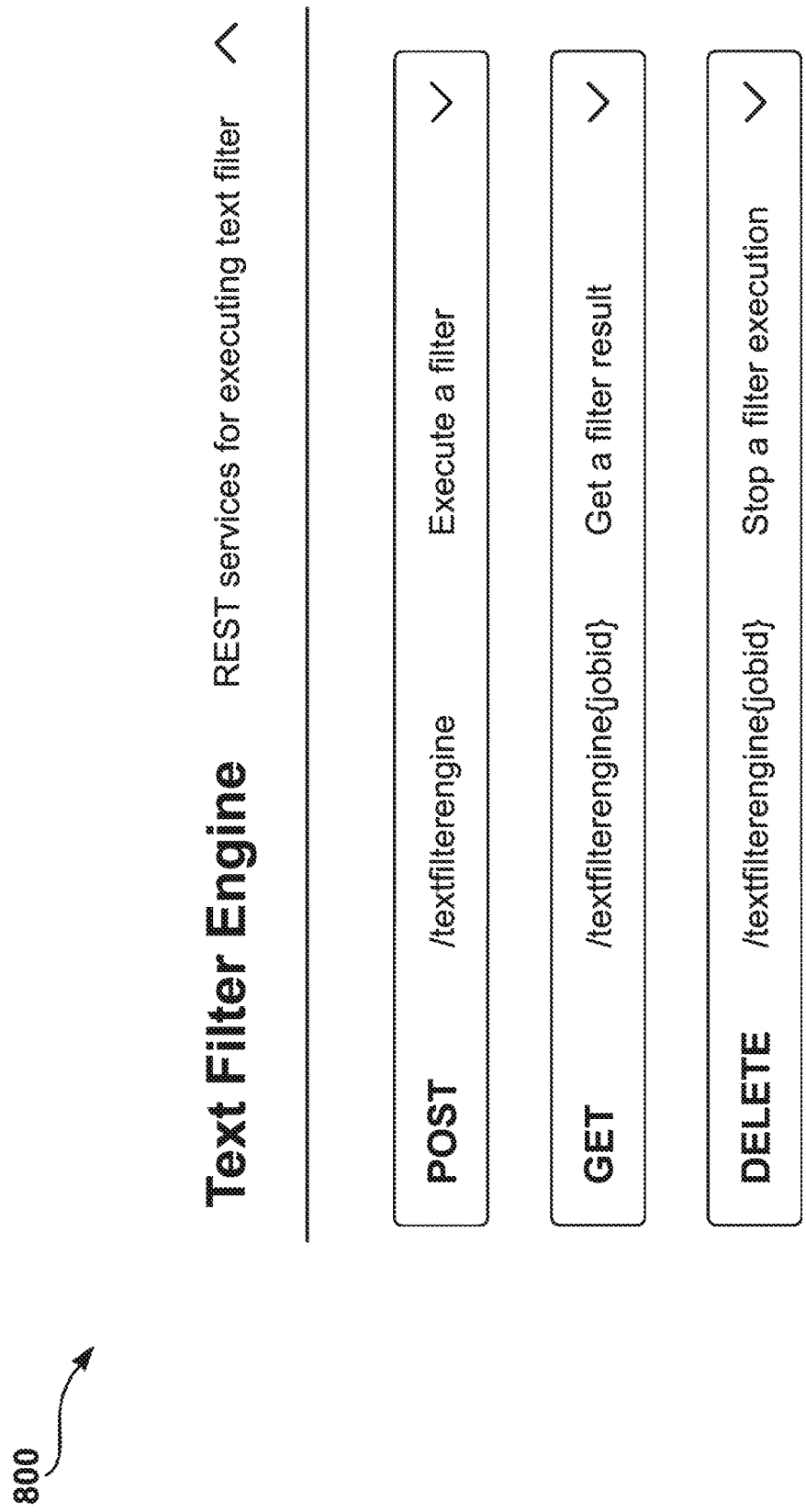
FIG. 8 illustrates a block diagram of a text filtering engine for executing the text filter application programming interface, according to various embodiments of the present technology.

FIG. 8 illustrates a block diagram of a text filtering engine 800 for executing the text filter application programming interface, according to various embodiments of the present technology. For example, the text filtering engine 800 may be used for the securely searching of the textual content comprises text filtering, the text filtering comprising page location of matching text; and wherein the providing the results pages of the result documents to the user using the interactive searching interface comprises highlighting the page location of matching text in the result documents.

Some embodiments include a method comprising: providing an interactive searching interface for securely searching of textual content across a plurality of documents stored in a plurality of repositories comprising heterogenous data, the securely searching of the textual content comprising using a flexible search criteria and enforcing user access privileges to the plurality of documents; receiving a search request using the interactive searching interface from a user, the search request comprising the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

Various embodiments include the providing the results pages of the result documents to the user using the interactive searching interface comprises displaying the results pages of the result documents in the interactive searching interface, the results pages being highlighted.

Some embodiments include the providing the results pages of the result documents to the user comprises exporting the results pages of the result documents in a table format.

Various embodiments include the enforcing user access privileges to the plurality of documents comprises redacting personal information from the results pages of the result documents based on access privileges of the user.

Some embodiments include the access privileges of the user comprising hierarchical user access privileges.

Various embodiments include enforcing user access privileges to the plurality of documents comprises un-redacting personal information from the results pages of the result documents based on access privileges of the user.

Some embodiments include wherein the aggregation layer comprises an aggregation switch allowing multiple network connections to be bundled together into a single link enabling increased bandwidth and increased network performance.

Various embodiments include the plurality of documents comprise a plurality of document formats, the plurality of document formats comprising, advanced function presentation (AFP), portable document format (PDF), printer command language (PCL), and text (TXT).

Some embodiments include the flexible search criteria comprises a varying search scope, the varying search comprising a single page search result or multiple document folders.

Various embodiments include the securely searching of the textual content comprises text filtering, the text filtering comprising page location of matching text; and wherein the providing the results pages of the result documents to the user using the interactive searching interface comprises highlighting the page location of matching text in the result documents.

Various embodiments further include saving the unified search criteria definition to a single unified index; and using the single unified index for the unified searching.

Various embodiments include the single unified index comprises content from the plurality of repositories.

Various embodiments include the unified searching comprises a two-level text search in a single search, the two-level text search comprising a first search result comprising filtered pages that match a specified text pattern and a second search result, the second search result being text search results of the filtered pages.

Various embodiments further include integrating the first search result and the second search result into a single search result.

Various embodiments include the heterogenous data comprises different data types and different data formats.

Various embodiments include the providing the results pages of the result documents enables the user to cancel a search in real-time.

Various embodiments include the providing the results pages of the result documents to the user using the interactive searching interface comprises results being presented asynchronous in real-time.

Various embodiments include a system, comprising: one or more hardware processors configured by machine-readable instructions to perform the following operations: providing an interactive searching interface for securely searching of textual content across a plurality of documents stored in a plurality of repositories comprising heterogenous data, the securely searching of the textual content comprising using a flexible search criteria and enforcing user access privileges to the plurality of documents; receiving a search request using the interactive searching interface from a user, the search request comprising the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

Various embodiments include an apparatus, comprising: at least one memory storing computer program instructions; and at least one processor configured to execute the computer program instructions to cause the apparatus at least to perform the following operations: providing an interactive searching interface for securely searching of textual content across a plurality of documents stored in a plurality of repositories comprising heterogenous data, the securely searching of the textual content comprising using a flexible search criteria and enforcing user access privileges to the plurality of documents; receiving a search request using the interactive searching interface from a user, the search request comprising the flexible search criteria; metadata searching the plurality of repositories using the flexible search criteria, the metadata searching the plurality of repositories using the flexible search criteria for providing result documents; context searching the result documents, the context searching providing results pages of the result documents; integrating the metadata searching the plurality of repositories with the context searching the result documents into a unified search criteria definition; providing the results pages of the result documents to the user using the interactive searching interface, the providing the results pages of the result documents enforcing the user access privileges to the plurality of documents; receiving feedback from the user in response to the providing the results pages of the result documents to the user using the interactive searching interface; and unified searching, using the unified search criteria definition, the plurality of repositories in response to the feedback from the user, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

Various embodiments include the unified searching comprises a two-level text search in a single search, the two-level text search comprising a first search result comprising filtered pages that match a specified text pattern and a second search result, the second search result being text search results of the filtered pages.

Thus, the technology for securely searching textual content across multiple documents in various repositories while using flexible search criteria is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   providing an interactive searching interface for securely searching of textual content across a plurality of documents stored in a plurality of repositories comprising heterogenous data, the securely searching of the textual content comprising using a flexible search criteria and enforcing user access privileges to the plurality of documents;
   receiving a search request using the interactive searching interface from a user, the search request comprising the flexible search criteria;
   metadata searching the plurality of repositories using the flexible search criteria, the metadata searching the plurality of repositories using the flexible search criteria for providing result documents;
   context searching the result documents, the context searching providing results pages of the result documents;
   integrating the metadata searching the plurality of repositories with the context searching the result documents into a unified search criteria definition;
   providing the results pages of the result documents to the user using the interactive searching interface, the providing the results pages of the result documents enforcing the user access privileges to the plurality of documents; and
   unified searching, using the unified search criteria definition, the plurality of repositories, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

2. The method as recited in claim 1, wherein the providing the results pages of the result documents to the user using the interactive searching interface comprises displaying the results pages of the result documents in the interactive searching interface, the results pages being highlighted.

3. The method as recited in claim 1, wherein the providing the results pages of the result documents to the user comprises exporting the results pages of the result documents in a table format.

4. The method as recited in claim 1, the enforcing user access privileges to the plurality of documents comprises redacting personal information from the results pages of the result documents based on access privileges of the user.

5. The method as recited in claim 1, wherein the access privileges of the user comprising hierarchical user access privileges.

6. The method as recited in claim 1, the enforcing user access privileges to the plurality of documents comprises un-redacting personal information from the results pages of the result documents based on access privileges of the user.

7. The method as recited in claim 1, wherein the aggregation layer comprises an aggregation switch allowing multiple network connections to be bundled together into a single link enabling increased bandwidth and increased network performance.

8. The method as recited in claim 1, wherein the plurality of documents comprise a plurality of document formats, the plurality of document formats comprising, advanced function presentation (AFP), portable document format (PDF), printer command language (PCL), and text (TXT).

9. The method as recited in claim 1, wherein the flexible search criteria comprises a varying search scope, the varying search comprising a single page search result or multiple document folders.

10. The method as recited in claim 1,
wherein the securely searching of the textual content comprises text filtering, the text filtering comprising page location of matching text; and
wherein the providing the results pages of the result documents to the user using the interactive searching interface comprises highlighting the page location of matching text in the result documents.

11. The method as recited in claim 1, further comprising:
saving the unified search criteria definition to a single unified index; and
using the single unified index for the unified searching.

12. The method as recited in claim 11, wherein the single unified index comprises content from the plurality of repositories.

13. The method as recited in claim 11, wherein the unified searching comprises a two-level text search in a single search, the two-level text search comprising a first search result comprising filtered pages that match a specified text pattern and a second search result, the second search result being text search results of the filtered pages.

14. The method as recited in claim 13, further comprising integrating the first search result and the second search result into a single search result.

15. The method as recited in claim 1, wherein the heterogenous data comprises different data types and different data formats.

16. The method as recited in claim 1, wherein the providing the results pages of the result documents enables the user to cancel a search in real-time.

17. The method as recited in claim 1, wherein the providing the results pages of the result documents to the user using the interactive searching interface comprises results being presented asynchronous in real-time.

18. A system, comprising:
one or more hardware processors configured by machine-readable instructions to perform the following operations:
providing an interactive searching interface for securely searching of textual content across a plurality of documents stored in a plurality of repositories comprising heterogenous data, the securely searching of the textual content comprising using a flexible search criteria and enforcing user access privileges to the plurality of documents;
receiving a search request using the interactive searching interface from a user, the search request comprising the flexible search criteria;
metadata searching the plurality of repositories using the flexible search criteria, the metadata searching the plurality of repositories using the flexible search criteria for providing result documents;
context searching the result documents, the context searching providing results pages of the result documents;
integrating the metadata searching the plurality of repositories with the context searching the result documents into a unified search criteria definition;
providing the results pages of the result documents to the user using the interactive searching interface, the providing the results pages of the result documents enforcing the user access privileges to the plurality of documents; and
unified searching, using the unified search criteria definition, the plurality of repositories, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

19. An apparatus, comprising:
at least one memory storing computer program instructions; and
at least one processor configured to execute the computer program instructions to cause the apparatus at least to perform the following operations:
providing an interactive searching interface for securely searching of textual content across a plurality of documents stored in a plurality of repositories comprising heterogenous data, the securely searching of the textual content comprising using a flexible search criteria and enforcing user access privileges to the plurality of documents;
receiving a search request using the interactive searching interface from a user, the search request comprising the flexible search criteria;
metadata searching the plurality of repositories using the flexible search criteria, the metadata searching the plurality of repositories using the flexible search criteria for providing result documents;
context searching the result documents, the context searching providing results pages of the result documents;
integrating the metadata searching the plurality of repositories with the context searching the result documents into a unified search criteria definition;
providing the results pages of the result documents to the user using the interactive searching interface, the providing the results pages of the result documents enforcing the user access privileges to the plurality of documents; and
unified searching, using the unified search criteria definition, the plurality of repositories, the unified searching being interactive, iterative, and using a unified index resulting in faster query response times than the metadata searching the plurality of repositories, the unified searching further using an aggregation layer, the aggregation layer using an application programming interface for aggregating data of the plurality of repositories for federation of the plurality of repositories by allowing the unified searching of heterogenous repositories without migrating or having multiple versions of content of the plurality of repositories.

20. The apparatus as recited in claim 19, wherein the unified searching comprises a two-level text search in a single search, the two-level text search comprising a first search result comprising filtered pages that match a specified text pattern and a second search result, the second search result being text search results of the filtered pages.

* * * * *